Figure 1:
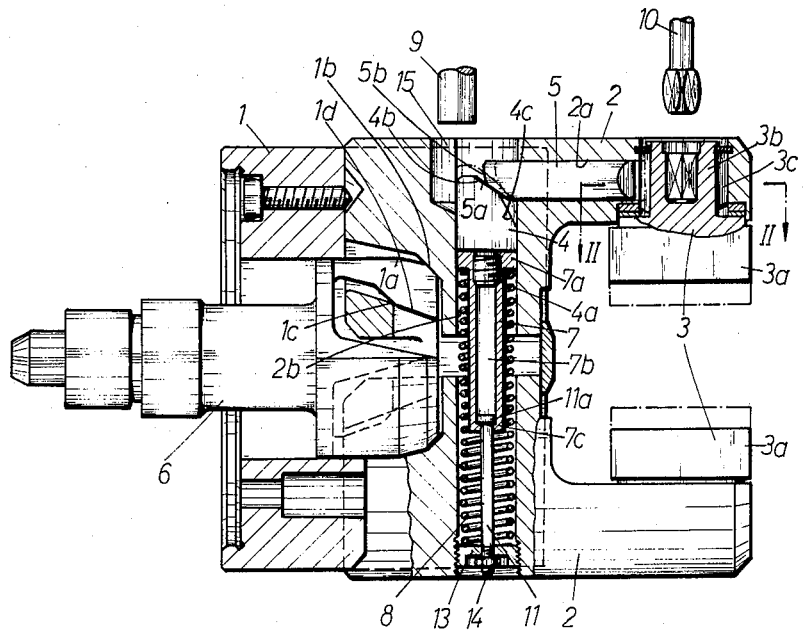
Figure 2:
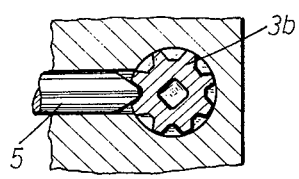

May 3, 1966  H. SCHARFEN  3,249,364

CHUCK, ESPECIALLY PAWL OPERATED CHUCK

Filed Sept. 21, 1964

3,249,364
CHUCK, ESPECIALLY PAWL OPERATED CHUCK
Hans Scharfen, Buderich, Germany, assignor to Paul Forkardt Kommanditgesellschaft, Dusseldorf, Germany
Filed Sept. 21, 1964, Ser. No. 397,745
Claims priority, application Germany, Sept. 24, 1963, F 40,816
9 Claims. (Cl. 279—5)

The present invention relates to a chuck, especially a power operable chuck, which is provided with one or more clamping elements which are operable together with the work piece clamped therebetween, i.e. can be rotated about an axis other than the axis of the chuck. More specifically, the present invention relates to a chuck of the above-mentioned type which is provided with locking means adapted to hold the adjustable clamping elements in certain positions.

Chucks of the above-mentioned type are known. However, these know chucks have the characteristic feature that the adjusting mechanism and the locking mechanism are both built into the chuck. However, machine tools exist in which, due to lack of space, it is impossible to build in a chuck with built-in adjusting mechanism. This may apply, for instance, to multi-spindle automats in which the diameter of the individual chuck is limited. On the other hand, it may also be impossible, with one-spindle machines, to provide a chuck with inside adjusting mechanism because, for instance, due to a high spindle speed, the diameter of the chuck must not exceed certain dimensions.

It is, therefore, an object of the present invention to provide a chuck which will overcome the above-mentioned drawbacks.

It is another object of this invention to provide a chuck as set forth in the preceding paragraph, which will be power operable and the outer diameter of which will be limited to a minimum.

These and other objects and advantages of the invention will appear more clearly from the following specification in connection with the accompanying drawing showing a longitudinal section through a chuck according to the present invention.

The chuck according to the present invention is provided with one or more clamping elements which are adjustable with a work piece clamped therebetween. Furthermore, the chuck is provided with locking means adapted to hold the adjustable clamping elements in certain positions while a locking piston for actuation of said locking means is provided, which locking piston is adapted to be actuated by a push-rod adapted to be introduced into the chuck from the outside. In conformity with the present invention, the chuck is equipped with inserts which together with the work piece are rotatable by a wrench adapted to be introduced into said inserts from the outside.

In conformity with the present invention, the locking piston is adapted by means of a push-rod to be moved against the thrust of an adjusting spring and is furthermore adapted when opening the clamping jaws to be withdrawn from the locking means by a tie-rod connected to a clamping jaw and by a sleeve. The locking piston adapted to actuate the locking means, and the adjusting spring are, according to the present invention arranged along the same diameter of the chuck and preferably within a clamping jaw or within a pair of clamping jaws. The locking piston and the locking means are provided with wedge surfaces of different inclinations.

The present invention thus yields a chuck which is suitable for power operation and the small outer diameter of which makes possible the employment of the chuck for any machine tool, especially for multi-spindle automats which have available a limited space only for the chuck, and also permits employment of the chuck on machine tools having high speeds.

Referring now to the drawing in detail, the left portion of the drawing shows the well-known structure of a power operable two-jaw chuck, in which a clamping piston 6 is journalled in the body 1 in such a way that it is adapted through the intervention of its wedge surfaces $1a$, $1b$, $1c$ and $1d$ to relieve and to clamp clamping jaws 2. The front ends of said clamping jaws 2 carry rotatable jaw inserts 3 which are rotatable about an axis which is perpendicular to the axis of rotation of said chuck. The insert 3 which carry the clamping members $3a$ have a neck portion $3b$ the periphery of which is provided with ratchet teeth $3c$. These ratchet teeth $3c$ are adapted to be engaged and disengaged by a locking member 5. That end of the locking member 5 which is adapted to engage the tooth spaces between adjacent ratchet teeth $3c$ is shaped in conformity with the said tooth spaces. The other end of locking member 5 is provided with a first wedge-shaped surface $5a$ and a second wedge-shaped surface $5b$ for a purpose explained further below. Locking member 5 is slidably mounted in a bore $2a$ of one of the clamping jaws 2. It will thus be appreciated that when the locking member 5 engages a tooth space between two ratchet teeth of adjacent insert 3, the latter will be held against rotation in its respective position.

In conformity with the present invention, a locking piston 4 for actuation of locking means 5 is slidably arranged in a bore $2b$ of chuck 2 which contains bore $2a$. The shank $4a$ of locking piston 4 is connected in any convenient manner to a sleeve 7, for instance, is screwed thereto. Said sleeve 7 has a collar $7a$ which engages the piston 4 and is slidable in the bore $2b$. Sleeve 7 has a bore $7b$ and a narrower bore $7c$ at the lower end of bore $7b$ (with regard to the drawing). Slidably mounted in bore $7b$ is the head $11a$ of a tie-rod 11 the lower end of which is threaded and extends through a disc 13 which is threadedly connected to the lower jaw 2 (with regard to the drawing). The lower end of tie-rod 11 has screwed thereto a nut 14 which engages the bottom surface of disc 13. A spring 8 is provided between disc 13 and collar $7a$ of sleeve 7 and continuously urges said sleeve 7 and said disc 13 away from each other.

Piston 4 is adapted to be actuated by a push-rod 9 which is adapted to enter from the outside into a bore 15 in the body of the chuck. The rotation of the jaw inserts 3 with the work piece clamped therebetween is effected by means of a wrench 10 adapted to be introduced from the outside into said inserts 3.

The locking piston 4 is adapted by means of push-rod 9 to be moved against the force of the adjusting spring 8. Piston 4 is also adapted when opening the jaws 2 to be withdrawn from locking means 5 by the fact that when the jaws 2 move away from each other, head $11a$ eventually engages the bottom of sleeve 7 and in the course of the further outward movement of the jaws 2 pulls sleeve 7 in the direction of the outward movement of that jaw 2 which is adjacent tie-rod 11. Advantageously, the locking piston 4 and the adjusting spring 8, sleeve 7, and tension rod 11 are arranged at one and the same diameter of the clutch body 1 and preferably within the clamping jaws 2. As will be seen from the drawing, locking piston 4 is similar to the inclined surfaces $5a$ and $5b$ provided with two differently inclined surfaces $4b$ and $4c$ for cooperation with the inclined surfaces of locking member 5. By the provision of differently inclined surfaces on each of the piston 4 and locking member 5, it is possible, in a manner known per se, to insure a fast adjustment and a subsequent safe lock.

The drawing illustrates the chuck in non-clamping or open position, i.e. in a condition in which both clamping jaws 2 occupy a position far toward the outside. In this condition, locking means 5 is pulled out of its locking position, i.e. in which its right-hand end engages a tooth space between two ratchet teeth of the respective adjacent insert 3b. Consequently, the jaw inserts 3 are rotatable. In the opened condition of the chuck, the locking piston 4 is, through sleeve 7 and tie rod 11, held firmly to the lower clamping jaw 2. When the chuck is moved into its clamping position and the two clamping elements 3a have moved toward each other, the locking piston 4 will, due to the effect of the adjusting spring 8 engage the adjacent end of locking member 5 so as to hold the inserts 3 in their respective position into which they have been moved by rotation thereof. The work piece clamped between the clamping elements 3a interconnects the two jaw inserts 3 in such a way that an additional locking of the lower jaw insert 3 is not necessary.

When the machining of a surface of the work piece has been completed and it is now necessary to turn the inserts 3 for turning the work piece into a position for machining another surface thereof, push-rod 9 will from the outside be inserted into bore 15 so as to push locking piston 4 back against the thrust of spring 8 thereby relieving the pressure exerted by locking piston 4 upon clamping member 5 either entirely or materially. It will be appreciated that when wrench 10 is now inserted into insert 3 for turning the same to thereby turn the work piece clamped between the clamping elements 3a into another working position, the ratchet teeth 3c will push the locking member 5 toward the left. When the insert 3b has been turned by the desired angle, push-rod 9 is withdrawn and spring 8 will again bring piston 4 into engagement with the locking element 5 and push the same into ratchet and locking engagement with the insert 3 thereby firmly holding said insert in its new position. It will be appreciated that in this position, piston 4 has its left side (with regard to the drawing) supported by the adjusted body portion of the chuck. If piston 4 is not fully disengaged from locking member 5 by insertion of push-rod 9, the spring pressure acting on piston 4 and through the latter on locking member 5 will still permit the ratchet teeth of insert 3 when turning the latter to move the locking element 5 toward the left with regard to the drawing. While the push-rod and wrench 10 may be inserted into bore 15 and insert 3 respectively by hand, it is also possible, in conformity with a well-known practice in the machine tool art, to actuate said push-rod 9 and wrench 10 by mechanical, hydraulic or electric means. It is, of course to be understood that following any adjustment, the push-rod 9 and wrench 10 are withdrawn from the respective bores in the chuck and the insert, respectively. When at the end of the machining operation the chuck is unclamped, the locking means is unlocked in the manner described above. The operator will then be able manually to move the inserts 3 together with the work piece into the respective position required for the next machining operation.

It is, of course, to be understood that the present invention is, by no means, limited to the particular construction shown in the drawings, but also comprises any modifications within the scope of the appended claims.

What I claim is:

1. In a chuck: a plurality of radially adjustable members, means operatively connected to said members for adjusting the same radially relative to each other, a plurality of clamping elements respectively supported by said members and rotatable from the outside of said chuck about an axis substantially perpendicular with regard to the axis of said chuck, said clamping elements being adapted to hold a work piece therebetween, one of said clamping elements having a portion with recess means, an arresting member slidably supported by one of said radially adjustable members and movable into and out of said recess means for respectively preventing and permitting rotation of said one clamping element about an axis perpendicular to the axis of said chuck, and a locking member operable to move in a first direction for moving said arresting member into and under pressure holding the same in engagement with said recess means, said locking member also being movable from the outside of said chuck in a second direction for reducing pressure on said arresting member to permit disengagement thereof from said recess means to thereby allow rotation of said clamping elements about an axis perpendicular to the axis of said chuck.

2. A chuck according to claim 1, in which that radially adjustable member which slidably supports said arresting member has a peripheral recess adjacent to and communicating with said locking member for receiving a tool from the outside of said chuck for moving said locking member in said second direction.

3. A chuck according to claim 1, in which that clamping element which has a portion thereof provided with recess means has a radially extending opening accessible from the outside of said chuck for receiving a tool for rotation of said clamping element.

4. In a chuck: a plurality of radially adjustable members, means operatively connected to said members for adjusting the same radially relative to each other, a plurality of clamping elements respectively supported by said members and rotatable from the outside of said chuck about an axis substantially perpendicular with regard to the axis of said chuck, said clamping elements being adapted to hold a work piece therebetween, one of said clamping elements having a portion with recess means, an arresting member slidably supported by one of said radially adjustable members and movable into and out of said recess means for respectively preventing and permitting rotation of said one clamping element about an axis perpendicular to the axis of said chuck, a locking member movable in a first direction for moving said arresting member into and holding the same in engagement with said recess means, and spring means continuously urging said locking member to move in said first direction, said locking member also being movable from the outside of said chuck in a second direction against the thrust of said spring means for reducing pressure on said arresting member by said locking member to thereby permit disengagement of said arresting member from said recess means and to allow rotation of said clamping elements about an axis perpendicular to the axis of said chuck.

5. A chuck according to claim 4, which includes means operatively connected to said locking member and operable in response to a certain radial movement of said radially adjustable members away from each other to move said locking member in said second direction.

6. A chuck according to claim 4, in which said locking member and said spring means are arranged substantially along the same radial plane of said chuck.

7. A chuck according to claim 4, in which said locking member and said spring means are located within said radially adjustable members.

8. In a chuck: a plurality of radially adjustable members, means operatively connected to said members for adjusting the same radially relative to each other, a plurality of clamping elements respectively supported by said members and rotatable from the outside of said chuck about an axis substantially perpendicular with regard to the axis of said chuck, said clamping elements being adapted to hold a work piece therebetween, one of said clamping elements having a portion with recess means, an arresting member slidably supported by one of said radially adjustable members and extending in axial direction of said chuck, one end of said arresting member being movable into and out of said recess means for respectively preventing and permitting rotation of said one clamping element about an axis perpendicular to the axis of said chuck, the other end of said arresting member being provided with two adjacent inclined surfaces of different angle inclination, and a locking member having one end provided with two adjacent wedge surfaces of different angle of inclination for cooperation with the wedge surfaces of said arresting member, said locking member being movable substantially perpendicularly with regard to the longitudinal axis of said arresting member and being operable to move in a first direction for moving said arresting member into and under pressure holding the same in engagement with said recess means, said locking member also being movable from the outside of said chuck in a second direction for reducing pressure on said arresting member to permit disengagement thereof from said recess means to thereby allow rotation of said clamping elements about an axis perpendicular to the axis of said chuck.

9. A chuck according to claim 1, in which said one clamping element is provided with peripheral ratchet teeth, and in which that portion of said arresting member which is adjacent to said ratchet teeth is provided with two converging surfaces corresponding to the space between two ratchet teeth for engagement with a tooth space between two adjacent ratchet teeth.

References Cited by the Examiner
UNITED STATES PATENTS

| | | | |
|---|---|---|---|
| 983,918 | 2/1911 | McClellen | 279—5 |
| 2,732,216 | 1/1956 | Sloan | 279—5 |
| 3,096,097 | 7/1963 | Roddy | 279—5 |

ROBERT C. RIORDON, *Primary Examiner.*

H. V. STAHLHUTH, *Assistant Examiner.*